(12) United States Patent
Georget et al.

(10) Patent No.: US 6,251,977 B1
(45) Date of Patent: Jun. 26, 2001

(54) ELASTOMER COMPOSITION BASED ON EPDM, AND A POWDER TRANSMISSION BELT MADE ESSENTIALLY OUT OF SAID ELASTOMER

(75) Inventors: Pierre Georget, Chambray les Tours; Julie Morcel, Saint Cyr sur Loire, both of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/329,312

(22) Filed: Jun. 10, 1999

(30) Foreign Application Priority Data

Jun. 11, 1998 (FR) .................................................. 98 07346

(51) Int. Cl.$^7$ .............................. C08K 5/04; F16G 1/02; F16G 1/10
(52) U.S. Cl. ............................. 524/397; 524/496; 525/74
(58) Field of Search ..................................... 524/397, 496; 474/264, 271, 191; 525/74

(56) References Cited

U.S. PATENT DOCUMENTS

| | | | | |
|---|---|---|---|---|
| 3,519,609 | * | 7/1970 | McConnell et al. | 525/386 |
| 3,527,736 | * | 9/1970 | Ayets Averink et al. | 525/386 |
| 3,644,248 | * | 2/1972 | Luijk et al. | 525/386 |
| 3,884,882 | * | 5/1975 | Caywood | 525/386 |
| 4,192,790 | | 3/1980 | McKinstry et al. | 260/31.2 |
| 5,098,105 | * | 3/1992 | Sullivan | 525/74 |
| 5,300,569 | * | 4/1994 | Drake et al. | 525/74 |
| 5,352,739 | | 10/1994 | Arjunan | 525/75 |
| 5,610,217 | | 3/1997 | Yarnell et al. | 524/324 |
| 5,962,593 | * | 10/1999 | Hergenrother et al. | 52/274 |

* cited by examiner

*Primary Examiner*—Veronica P. Hoke
(74) *Attorney, Agent, or Firm*—Morgan, Lewis & Bockius LLP

(57) ABSTRACT

An elastomer composition for curing by organic peroxides, the composition comprising an EPDM, a filler such as carbon black, and an additive such as zinc methacrylate, together with an elastomer grafted with maleic anhydride that reacts with the zinc methacrylate to reinforce the curing of the elastomer. The invention applies in particular to the manufacture of power transmission belts.

13 Claims, 1 Drawing Sheet

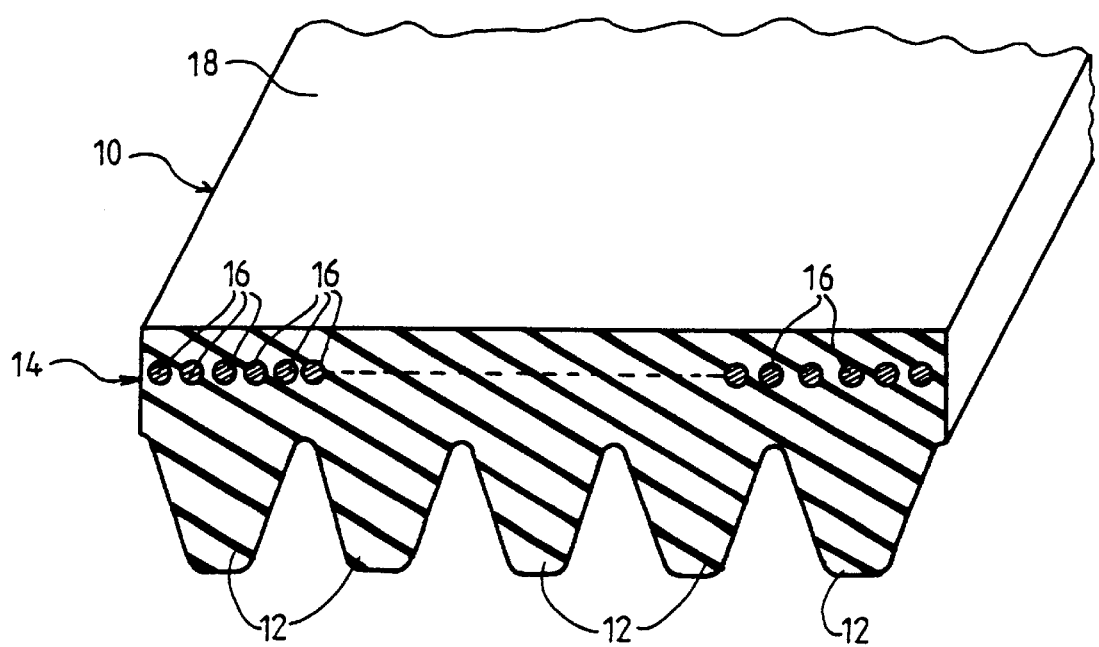

ELASTOMER COMPOSITION BASED ON EPDM, AND A POWDER TRANSMISSION BELT MADE ESSENTIALLY OUT OF SAID ELASTOMER

The invention relates to an elastomer composition based on EPDM, and to a power transmission belt made of elastomer having said composition.

BACKGROUND OF THE INVENTION

Proposals have already been made on numerous occasions to use EPDM-based elastomers cured by organic peroxides in the manufacture of power transmission belts, because of the qualities and advantages of such elastomers such as cost, operating temperature range, and ability to withstand oxygen and ozone, such EPDM-based elastomers having additives which improve their dynamic properties such as resistance to fatigue and to wear, their breaking strength, and their modulus of elasticity, and also their adhesion to traction cords, which additives are generally constituted by metallic salts of $\alpha,\beta$-unsaturated organic acids (in particular zinc methacrylate) plus reinforcing fillers such as carbon black and possibly fibers, e.g. aramid fibers.

OBJECTS AND SUMMARY OF THE INVENTION

A particular object of the invention is to further improve the dynamic properties of EPDM-based elastomers, in particular for use in manufacturing power transmission belts.

To this end, the invention provides an elastomer composition for curing by organic peroxides, the composition essentially comprising, prior to curing, EPDM, at least one filler such as carbon black, for example, and a metallic salt of an $\alpha,\beta$-unsaturated organic acid, the composition comprising another additive which reacts with the above-specified metallic salt to enhance the curing of the elastomer, said other additive being essentially formed by an elastomer grafted with maleic anhydride.

Unexpectedly, the elastomer grafted with maleic anhydride reacts with the $\alpha,\beta$-unsaturated organic acid metallic salt to reinforce the curing of the EPDM-based elastomer and to improve its dynamic characteristics, such as in particular its modulus of elasticity, its breaking strength, and its hardness.

In general, the composition of the invention may comprise 2 to 30 parts by weight approximately of said other additive and 2 to 50 parts by weight approximately of the above-mentioned metallic salt per 100 parts by weight of EPDM.

In a preferred embodiment of the invention, said composition comprises about 3 to 5 parts by weight of said other additive and 15 to 25 parts by weight approximately of the above-mentioned metallic salt per 100 parts by weight of EPDM, the metallic salt is zinc methacrylate, in particular zinc mono-methacrylate, and the elastomer grafted with maleic anhydride is selected from polybutadiene, polyisoprene, polypropylene, and an ethyl vinyl acetate (EVA) copolymer.

It is also possible in a composition of the invention to use an elastomer comprising EPDM only or an elastomer which is a mixture of EPDM and some other elastomer such as hydrogenated nitrile rubber to improve resistance to oils and solvents (or possibly a nitrile rubber which is less expensive than hydrogenated nitrile rubber), and/or a polybutadiene to improve the dynamic properties and resistance to wear, or indeed a natural rubber to improve the raw adhesion, or a chlorosulfonated polyethylene with alkyl groups.

The invention also provides a power transmission belt, made essentially out of an elastomer having the above-defined composition.

BRIEF DESCRIPTION OF THE DRAWING

The invention will be better understood and other characteristics, details, and advantages thereof will appear more clearly on reading the following description, given with reference to the accompanying drawing which is a fragmentary diagrammatic section view and perspective view of a belt of the invention.

MORE DETAILED DESCRIPTION

This belt 10 which is designed to rotate any rotary member, is of the "poly-V" type and it comprises on its inside surface a certain number of circumferential ribs 12 of trapezoidal cross-section, said ribs 12 being mutually parallel and extending over the entire length of the belt, and being designed to be engaged in grooves of complementary shape in the pulleys on which the belt 10 is mounted.

The belt has at least one sheet 14 of traction cords 16 which are embedded in the elastomer of the belt, between its top surface 18 and the ribs 12, with the cords 16 being spiral-wound inside the belt and with the number of turns thereof being a function of the mechanical characteristics desired of the belt.

According to the invention, the belt 10 is made out of an EPDM elastomer whose curing has been reinforced and whose dynamic characteristics have been considerably improved by synergy between a metallic salt of an $\alpha,\beta$-unsaturated organic acid (in particular zinc methacrylate) and an elastomer grafted with maleic anhydride (in particular a polybutadiene). Typically, the elastomer of the invention has the following composition prior to curing:

EPDM: 100 parts by weight;
zinc mono-methacrylate: 2 to 5 parts by weight;
carbon black: 10 to 100 parts by weight;
carbon black dispersion agent: 1 to 10 parts by eight;
polybutadiene grafted with maleic anhydride: 2 to 20 parts by weight;
antioxidant: 0.5 to 8 parts by weight;
organic peroxide: 0.5 to 8 parts by weight;
curing coagent: 0.5 to 5 parts by weight;
plasticizer: 1 to 20 parts by weight.

Preferably, the composition of the elastomer is as follows:
EPDM: 100 parts by weight;
zinc mono-methacrylate: 20 to 25 parts by weight;
carbon black: 50 to 60 parts by weight;
carbon black dispersion agent: 3 to 4 parts by weight;
polybutadiene grafted with maleic anhydride: 3 to 5 parts by weight;
antioxidant: 1.5 to 3 parts by weight;
organic peroxide: 2 to 4 parts by weight;
curing coagent: 1 to 3 parts by weight;
plasticizer: 1 to 10 parts by weight.

The composition of the elastomer of the invention may also comprise:

hydrogenated nitrile butadiene rubber (HNBR) constituting 2 to 20 parts by weight approximately to improve resistance to oils and to solvents, or nitrile butadiene rubber (NBR) in the same quantities and for the same purpose;

polybutadiene (BR) constituting 2 to 20 parts by weight approximately to improve dynamic properties and resistance to abrasion;

chloro-sulfonated polyethylene with alkyl groups (ACSM) constituting 2 to 40 parts by weight approximately to increase resistance to oils and resistance to tearing; and natural rubber comprising 2 to 20 parts by weight approximately to improve raw adhesion, so that the composition of the invention then has 98 to 80 parts by weight of EPDM.

In addition, it may also have polyamide, aramid, polyester, rayon, cotton, or glass fibers constituting 3 to 30 parts by weight approximately to improve the transverse strength of the belt manufactured with the elastomer composition.

In practice, the metallic salt such as zinc methacrylate and the elastomer such as polybutadiene grafted with maleic anhydride as used in said composition are both added to the EPDM in the form of powders, e.g. on a silica medium, for greater convenience.

The elastomer of the invention has dynamic characteristics which are significantly better than those of known EPDM elastomers which comprise, prior to curing, a metallic salt of the above-mentioned type, but which do not have an elastomer grafted with maleic anhydride for the purpose of reacting with the metallic salt.

Tests performed on elastomers of the invention have shown, in particular, that for given samples that differ from one another only in their quantities of zinc methacrylate and of polybutadiene grafted with maleic anhydride:

breaking strength goes from about 17 MPa to about 20 MPa when the quantity of grafted polybutadiene goes from 1 part by weight to 4 parts by weight, and the maximum value thereof depends little on the quantity of zinc methacrylate;

breaking elongation goes from about 300% to about 600% when the quantity of grafted polybutadiene goes from about 1 part by weight to 8 parts by weight, and decreases when the quantity of zinc methacrylate increases;

tearing strength (ability to withstand propagation of a notch) goes from about 32 N/mm to 40 N/mm when the quantity of grafted polybutadiene goes from about 1 part by weight to 8 parts by weight, and it decreases when the quantity of zinc methacrylate increases; and hardness on the Shore A scale goes from about 60 to about 75 when the quantity of zinc methacrylate goes from 0 to 45 parts by weight, and decreases slightly when the quantity of grafted polybutadiene increases.

The preferred composition of the elastomer of the invention, as indicated above, makes it possible to obtain the best compromise between these characteristics, i.e., maximum breaking strength and hardness for elongation on breaking and tear strength having values that are greater than those of comparable elastomers in the prior art.

It has also been observed that, when hot, the elastomer of the invention behaves better in terms of its dynamic modulus of elasticity, since this modulus remains substantially constant and even increases slightly on temperature increasing from 60° C. to 120° C., whereas the modulus decreases significantly over the same increase in temperature in comparable elastomers of the prior art.

The elastomer composition of the invention is naturally suitable for use in manufacturing products other than power transmission belts, providing said other products are subjected to dynamic loading in normal use.

What is claimed is:

1. An organic peroxide curable elastomer composition comprising:

(a) EPDM, (b) at least one filler, (c) about 2 to about 50 parts by weight per 100 parts by weight of EPDM of a metallic salt of an $\alpha,\beta$-unsaturated organic acid; and (d) about 2 to about 30 parts by weight per 100 parts by weight of EPDM, of an elastomer grafted with maleic anhydride, said elastomer selected from the group consisting of polybutadiene, polyisoprene, polypropylene, and an ethylene/vinyl acetate copolymer.

2. A composition according to claim 1, comprising about 3 to 5 parts by weight of said elastomer grafted with maleic anhydride per 100 parts by weight of EPDM, and about 20 to 25 parts by weight of said metallic salt per 100 parts by weight of EPDM.

3. A composition according to claim 1, wherein said metallic salt is zinc methacrylate.

4. A composition according to claim 1, wherein the elastomer grafted with maleic anhydride and said metallic salt are in the form of powders.

5. A composition according to claim 1, also comprising a nitrile rubber or a hydrogenated nitrile rubber.

6. A composition according to claim 1 also comprising polybutadiene.

7. A composition according to claim 1, also comprising natural rubber.

8. A composition according to claim 1, also comprising a chloro-sulfonated polyethylene with alkyl groups.

9. A composition according to claim 1, further comprising a reinforcing fiber.

10. A power transmission belt comprised of the elastomer composition defined in claim 1.

11. A composition according to claim 1, wherein the filler comprises carbon black.

12. A composition according to claim 1, further comprising an organic peroxide.

13. A composition according to claim 11, wherein said reinforcing fiber comprises a polyamide, aramid, polyester, rayon, cotton, or glass.

\* \* \* \* \*